UNITED STATES PATENT OFFICE.

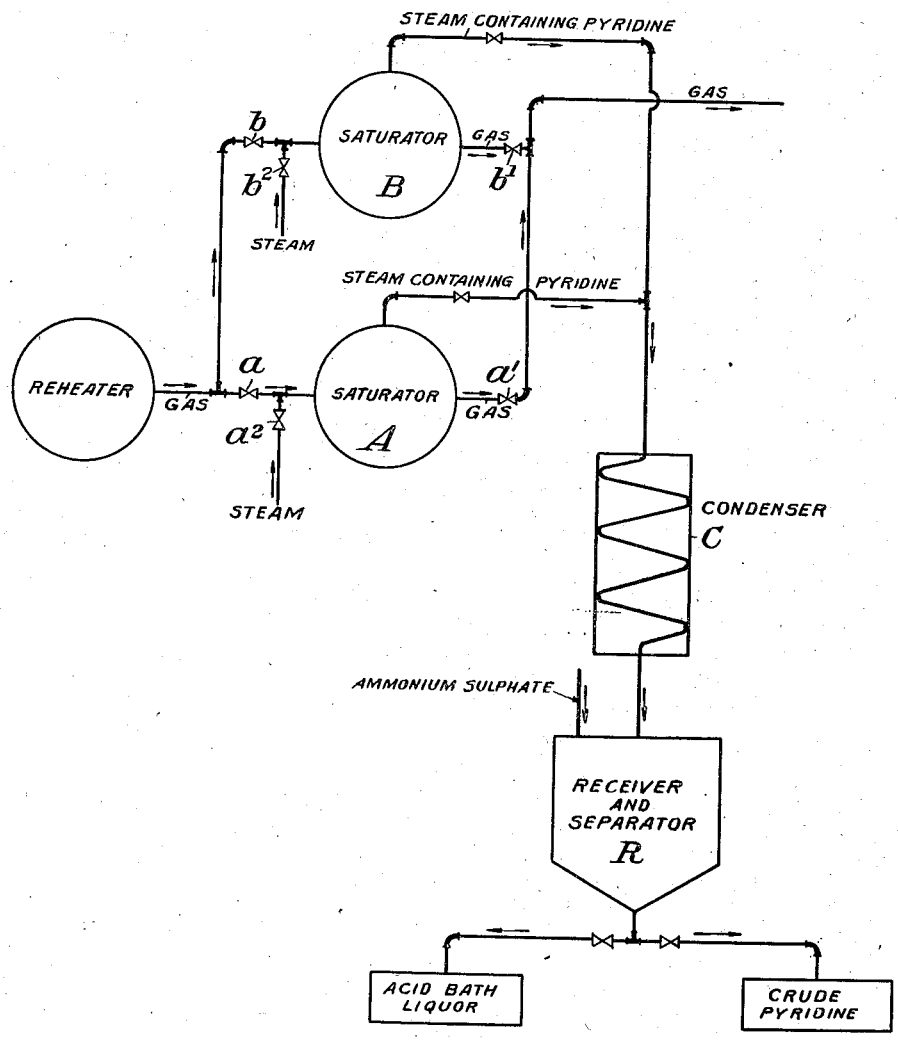

FREDERICK W. SPERR, JR., AND RALPH L. BROWN, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

RECOVERY OF PYRIDINE FROM AMMONIUM SULPHATE SOLUTIONS.

1,414,441. Specification of Letters Patent. Patented May 2, 1922.

Application filed October 5, 1920. Serial No. 414,758.

*To all whom it may concern:*

Be it known that we, FREDERICK W. SPERR, Jr., and RALPH L. BROWN, both citizens of the United States, residing at Pittsburgh, in the county of Allegheny and State of Pennsylvania, have invented a new and useful Improvement in the Recovery of Pyridine from Ammonium Sulphate Solutions, of which the following is a full, clear, and exact description.

The present invention relates to the recovery of pyridine from ammonium sulphate solutions. In the manufacture of by-product coke and illuminating gas, pyridine bases are present in the crude gas and are finally found in the tar, ammonia liquors, ammonium sulphate, light oils, etc. Some of the higher boiling pyridine bases are separated in the tar, but the gas after the removal of the tar, contains a considerable proportion of them, especially of the low boiling pyridine bases. A large proportion of these pyridine bases are absorbed in the sulphuric acid bath along with the ammonia in the saturators as employed in the direct or semi-direct ammonium sulphate rocovery process. The efficiency of this absorption of the pyridine in the saturator bath is principally dependent on the state of saturation of the bath liquor with pyridine and the free acid concentration. As the amount of pyridine in the bath liquor rises above two per cent, larger losses of pyridine occur in the ammonium sulphate and in the gas leaving the saturator. After saturation of the bath liquor with the pyridine bases, there exists a state of equilibrium between the amounts of pyridine in the inlet gas, outlet gas, ammonium sulphate, salt and liquor, which is governed by the amount of pyridine in the inlet gas and the temperature and acidity of the bath.

Various methods have been suggested for the recovery of these pyridine bases from the acid bath liquor. For example, it has been suggested that the acid bath liquor be treated with ammonia to liberate the pyridine bases from their combination with the acid of the bath and then distill the solution. This process, however, entails the removal of the bath liquor from the saturators into separate containers, its neutralization and treatment with dried ammonia gas and its distillation. The distillate contains considerable ammonia as well as the pyridines and some unavoidable loss of ammonia must occur in this process. The neutralization of the acid bath liquor with ammonia throws down a fine blue precipitate containing ferri- or ferro-cyanide of iron which must be filtered out of the solution after distillation to prevent contamination of the ammonium sulphate when this solution is returned to the acid bath. Fresh acid must also be used in acidifying the bath liquor after the distillation of the pyridine.

The object of the present invention is to more economically recover the pyridine bases from the ammonium sulphate solution and, particularly, to accomplish such recovery with but little interference in the regular operation of the by-product plant. In our process we dispense with the treatment of the acid liquor bath with ammonia and recover the pyridine directly from its acid solution. While the recovery of the pyridine from a strong acid solution is difficult, we have found that pyridine can be readily steam distilled from an acid bath of low acidity. We have found that this can be readily accomplished with solutions of not more than two (2%) per cent acidity. We have also found that the distillation of the pyridine from such solutions can be more advantageously accomplished by having the solution substantially saturated with the ammonium sulphate at its boiling point.

In the drawings we have illustrated schematically the application of the present invention to the pyridine recovery in a by-product plant employing the direct or semi-direct ammonium sulphate process.

Referring to the drawing, the gas passes from the reheater into one of the saturators A or B, for example, into the saturator A. The gas passes into the saturator until the concentration of pyridine in the sulphuric acid bath liquor has risen to that point where appreciable amounts of pyridine are being lost in the ammonium sulphate and in the gas leaving the saturator. Then the concentration of the acid bath is allowed to decrease to about one or two per cent by discontinuing the addition of sulphuric acid to the saturator bath. We have found that the bath liquor can be allowed to decrease in acidity to this amount without entailing any material loss of ammonia because of it. Then the valves $a$ and $a'$ are closed and the valves $b$ and $b'$ are opened to divert the gas from the saturator A to the saturator B.

The valve $a^2$ is then opened to admit steam into the saturator A and the acid bath solution is steam distilled to drive off the pyridine. The distillate passes over into a condenser C where it is condensed and cooled as a pyridine-water solution. Only small traces of ammonia are distilled off with the pyridine as the ammonia is held in combination with the sulphuric acid more strongly than the pyridine. When the distillation of the pyridine is completed, or when the distillation has proceeded far enough so that its continuation would not be economical due to the dilution of the condensate, the steam is shut off. The saturator A is then ready to be put back into regular operation by increasing the acidity of its bath and returning the gas stream through it.

We have found that the distillation of the pyridine can be much better effected if the acid bath solution is substantially saturated with ammonium sulphate at its boiling point. Such saturation can be accomplished either by the direct addition of ammonium sulphate to the bath or by allowing the ammonium sulphate to accumulate in the bath before the steam distillation is started. The saturation of the acid bath liquor with ammonium sulphate raises its boiling point which permits the removal of the pyridine with a smaller quantity of steam. This not only saves steam but also increases the concentration of the pyridine in the distillate, thereby facilitating its separation therefrom. A marked improvement in the regular operation of the by-product plant is effected by the removal of the pyridine in this manner. The saturators are periodically given a thorough steaming which assists in the manufacture of a white ammonium sulphate salt. The ammonium sulphate is also practically free from pyridine bases, which is advantageous in some of the uses to which this salt is put. Moreover, the pyridine-free salt will cake much less than salt containing pyridine.

The pyridine will be recovered by using the saturators A and B alternately, the distillate from both saturators passing into the condenser C. The pyridine may be separated from the pyridine-water condensate by a number of methods. For example, the pyridine may be separated by agitating the condensate with an oil which absorbs the pyridine.

We preferably, however, run the condensate from the condenser C into a receiver and separator R in which the distillate is saturated with ammonium sulphate. This saturation causes a gravitational separation of the pyridine bases and the water solution. The separated layers are then drawn off into separate tanks. The water containing the ammonium sulphate is put back into the acid bath to recover the sulphate.

While we have specifically described our invention with particular reference to the recovery of pyridine from the acid baths of by-product plant saturators, it is to be understood that the invention may be otherwise practised and embodied within the scope of the following claims:

We claim:

1. That step in the herein described process of recovering pyridine from acid solutions containing pyridine which consists in distilling off the pyridine from the acid solution, substantially as described.

2. The process of recovering pyridine from acid solutions of ammonium sulphate containing pyridine, comprising reducing the acid content of the solution to not more than two (2%) per cent, and distilling off the pyridine, substantially as described.

3. The process of recovering pyridine from acid solutions of ammonium sulphate containing pyridine, comprising substantially saturating the solution with ammonium sulphate at its boiling point, and distilling off the pyridine, substantially as described.

4. The process of recovering pyridine from acid solutions of ammonium sulphate containing pyridine, comprising reducing the acid content of the solution to not more than two (2%) per cent, substantially saturating the solution with ammonium sulphate at its boiling point, and distilling off the pyridine, substantially as described.

5. The process of recovering pyridine from acid solutions of ammonium sulphate containing pyridine, comprising passing steam into the solution and thereby steam distilling off the pyridine, substantially as described.

6. That step in the herein described process of recovering pyridine from acid solutions of ammonium sulphate containing pyridine, which consists in steam distilling the pyridine from the acid solution, substantially as described.

7. The process of recovering pyridine from acid solutions of ammonium sulphate containing pyridine, comprising reducing the acid content of the solution to not more than two (2%) per cent, and steam distilling the pyridine from such acid solution, substantially as described.

8. That step in the herein described process of recovering pyridine from non-alkaline solutions of ammonium sulphate containing pyridine, which consists in distilling off the pyridine from such non-alkaline solution, substantially as described.

9. The process of recovering pyridine from non-alkaline solutions of ammonium sulphate containing pyridine, comprising substantially saturating the solution with ammonium sulphate at its boiling point, and steam distilling off the pyridine, substantially as described.

10. Those steps in the herein described process of recovering pyridine which consist in passing crude ammonia and pyridine-containing gas into a saturator until the bath liquor is substantially saturated with pyridine, then diverting the gas to another saturator, and passing steam into the first saturator to distill off the pyridine, and thereafter re-diverting the gas into the first saturator, substantially as described.

11. Those steps in the herein described process of recovering pyridine which consist in passing the crude ammonia and pyridine containing gas through a saturator containing a sulphuric acid bath until the bath is charged with pyridine, then diverting the gas to another saturator, and distilling off the pyridine from the pyridine-containing acid bath, and afterward re-diverting the gas to the first saturator, substantially as described.

12. Ammonia and pyridine recovering apparatus, comprising a plurality of ammonia recovering saturators containing sulphuric acid baths, means for passing the crude ammonia and pyridine laden gas through the different saturators, means for distilling off the pyridine from the acid baths in the saturators, and means for condensing the distillate, substantially as described.

13. Apparatus for ammonia and pyridine recovering, comprising a plurality of ammonia recovering saturators containing sulphuric acid baths, means for leading the ammonia and pyridine laden gas to the desired saturator or saturators, means for injecting steam into the desired saturator or saturators to distill off the pyridine absorbed in the acid bath, and means for condensing the pyridine distillate, substantially as described.

14. Apparatus for ammonia and pyridine recovering, comprising a plurality of ammonia recovering saturators, containing sulphuric acid baths, means for passing the crude ammonia and pyridine laden gas through the saturators intermittently, means for injecting steam into the saturator from which the gas is cut off to distill off the pyridine from the acid baths, and means for condensing the distillate, substantially as described.

15. Apparatus for ammonia and pyridine recovering, comprising a plurality of ammonia recovering saturators, containing sulphuric acid baths, means for passing the crude ammonia and pyridine laden gas through the saturators intermittently, means for injecting steam into the saturator from which the gas is cut off to distill off the pyridine from the acid bath, means for condensing the distillate, and means for collecting the distillate and separating the water and pyridine, substantially as described.

16. The process of recovering pyridine from acid solutions of ammonium sulphate having an acid content of not more than two (2%) per cent, comprising substantially saturating the solution with ammonium sulphate at its boiling point and steam distilling off the pyridine from such saturated acid solution, substantially as described.

In testimony whereof, we have hereunto set our hands.

FREDERICK W. SPERR, Jr.
RALPH L. BROWN.